(12) United States Patent
Welicki et al.

(10) Patent No.: US 9,672,276 B2
(45) Date of Patent: Jun. 6, 2017

(54) MULTI-ACT CREATION USER INTERFACE ELEMENT

(71) Applicant: Microsoft Technology Licensing, LLC, Redmond, WA (US)

(72) Inventors: Leon Ezequiel Welicki, Issaquah, WA (US); Brad Olenick, Redmond, WA (US); Vishal R. Joshi, Redmond, WA (US); Andrew Birck, Seattle, WA (US); Alvaro Rahul Dias, Bellevue, WA (US); Guru Kumaraguru, Redmond, WA (US); Federico Silva Armas, Seattle, WA (US); Stephen Michael Danton, Seattle, WA (US); Brendyn Alexander, Seattle, WA (US); David Anson, Snoqualmie, WA (US); Jean-Sebastien Guopil, Redmond, WA (US); Bradley D. Millington, Bellevue, WA (US); Adam Abdelhamed, Bellevue, WA (US); Jesse David Francisco, Lake Stevens, WA (US); Wai Man Yuen, Bellevue, WA (US); Jon Harris, Sammamish, WA (US); Jonah Bush Sterling, Seattle, WA (US); Karandeep Singh Anand, Redmond, WA (US); William J. Staples, Duvall, WA (US); Madhur Joshi, Kirkland, WA (US); Nathan J. Totten, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 237 days.

(21) Appl. No.: 14/231,883

(22) Filed: Apr. 1, 2014

(65) Prior Publication Data

US 2015/0095813 A1   Apr. 2, 2015

Related U.S. Application Data

(60) Provisional application No. 61/905,128, filed on Nov. 15, 2013, provisional application No. 61/884,743, (Continued)

(51) Int. Cl.
*G06F 17/30* (2006.01)
*G06F 9/44* (2006.01)
(Continued)

(52) U.S. Cl.
CPC ...... *G06F 17/30654* (2013.01); *G06F 3/0481* (2013.01); *G06F 3/0482* (2013.01);
(Continued)

(58) Field of Classification Search
CPC .................................................. G06F 3/0484
See application file for complete search history.

(56) References Cited

U.S. PATENT DOCUMENTS

| 5,886,694 A | 3/1999 | Breinberg et al. |
| 6,473,891 B1 | 10/2002 | Shively |

(Continued)

FOREIGN PATENT DOCUMENTS

| EP | 1615118 | 1/2006 |
| WO | WO 02097601 A2 | 12/2002 |

OTHER PUBLICATIONS

"ACC97: How to Modify Query Properties in Microsoft Access", Available at least as early as Jan. 13, 2015, Available at <<http://support.microsoft.com/kb/304451>>.

(Continued)

*Primary Examiner* — David Choi
(74) *Attorney, Agent, or Firm* — Ben Tabor; Kate Drakos; Micky Minhas

(57) ABSTRACT

A multi-act creation user interface element that is displayed when a user instructs a computing system to initiate creation (Continued)

of a resource that has multiple associated creation processing acts. For each of some or all of the creation processing acts, the multi-act creation user interface element causes a set of one or more controls to appear, which the user may then enter creation information into. The multi-step creation user interface element persists creation information so entered so that the creation information is available for further creation processing acts.

21 Claims, 5 Drawing Sheets

Related U.S. Application Data filed on Sep. 30, 2013, provisional application No. 61/905,111, filed on Nov. 15, 2013, provisional application No. 61/905,243, filed on Nov. 17, 2013, provisional application No. 61/905,114, filed on Nov. 15, 2013, provisional application No. 61/905,116, filed on Nov. 15, 2013, provisional application No. 61/905,129, filed on Nov. 15, 2013, provisional application No. 61/905,105, filed on Nov. 15, 2013, provisional application No. 61/905,247, filed on Nov. 17, 2013, provisional application No. 61/905,101, filed on Nov. 15, 2013, provisional application No. 61/905,119, filed on Nov. 15, 2013.

(51) Int. Cl.
　　*G06F 3/0484*　　(2013.01)
　　*G06F 17/21*　　(2006.01)
　　*G06F 3/0481*　　(2013.01)
　　*G06F 3/0482*　　(2013.01)
　　*G06F 3/0485*　　(2013.01)
　　*G06F 3/0488*　　(2013.01)
　　*G06F 9/48*　　(2006.01)

(52) U.S. Cl.
　　CPC .......... *G06F 3/0484* (2013.01); *G06F 3/0485* (2013.01); *G06F 3/0488* (2013.01); *G06F 3/04817* (2013.01); *G06F 3/04842* (2013.01); *G06F 8/34* (2013.01); *G06F 9/4443* (2013.01); *G06F 9/4445* (2013.01); *G06F 9/4856* (2013.01); *G06F 17/218* (2013.01); *G06F 17/30398* (2013.01)

(56) References Cited

U.S. PATENT DOCUMENTS

| | | | |
|---|---|---|---|
| 6,750,887 B1 | 6/2004 | Kellerman et al. | |
| 6,919,890 B2 | 7/2005 | Halstead, Jr. | |
| 6,944,829 B2 | 9/2005 | Dando | |
| 6,950,198 B1 | 9/2005 | Beraducci et al. | |
| 6,950,993 B2 | 9/2005 | Breinberg | |
| 7,062,475 B1 | 6/2006 | Szabo et al. | |
| 7,243,335 B1 | 7/2007 | Andrew | |
| 7,340,721 B1 | 3/2008 | Bailey | |
| 7,417,644 B2 | 8/2008 | Cooper et al. | |
| 7,577,938 B2 | 8/2009 | Bent et al. | |
| 7,669,140 B2 | 2/2010 | Matthews et al. | |
| 7,730,418 B2 | 6/2010 | Wang et al. | |
| 7,769,794 B2 | 8/2010 | Moore et al. | |
| 7,823,077 B2 | 10/2010 | Kurtz et al. | |
| 7,933,632 B2 | 4/2011 | Flynt et al. | |
| 7,954,064 B2 | 5/2011 | Forstall et al. | |
| 8,095,412 B1 | 1/2012 | Zias et al. | |
| 8,181,156 B1 | 5/2012 | Bobykin | |
| 8,195,646 B2 | 6/2012 | Evans et al. | |
| 8,316,323 B2 | 11/2012 | Saraiya et al. | |
| 8,321,847 B1* | 11/2012 | Garvin | G06F 8/31 717/108 |
| 8,365,138 B2 | 1/2013 | Iborra et al. | |
| 8,453,065 B2 | 5/2013 | Chaudhri et al. | |
| 8,533,667 B2 | 9/2013 | Alexander et al. | |
| 8,543,824 B2 | 9/2013 | Louch et al. | |
| 8,856,681 B2 | 10/2014 | Rodden et al. | |
| 8,869,027 B2 | 10/2014 | Louch et al. | |
| 8,990,199 B1 | 3/2015 | Ramesh | |
| 9,195,477 B1 | 11/2015 | Spencer | |
| 9,244,661 B1* | 1/2016 | Garvin | G06F 8/31 |
| 9,244,971 B1 | 1/2016 | Kalki | |
| 2002/0105658 A1 | 8/2002 | Jackson et al. | |
| 2002/0138637 A1 | 9/2002 | Suzuoki et al. | |
| 2002/0147963 A1 | 10/2002 | Lee | |
| 2003/0011638 A1 | 1/2003 | Chung | |
| 2003/0058286 A1 | 3/2003 | Dando | |
| 2003/0090504 A1 | 5/2003 | Brook et al. | |
| 2003/0137540 A1 | 7/2003 | Klevenz et al. | |
| 2003/0210274 A1 | 11/2003 | Subramanian et al. | |
| 2004/0098390 A1 | 5/2004 | Bayliss et al. | |
| 2004/0225581 A1* | 11/2004 | Wyle | G06Q 40/02 705/31 |
| 2004/0243576 A1 | 12/2004 | Shrivastava et al. | |
| 2005/0125727 A1 | 6/2005 | Ramachandran et al. | |
| 2005/0131889 A1 | 6/2005 | Bennett et al. | |
| 2005/0177586 A1 | 8/2005 | Chen | |
| 2005/0188349 A1 | 8/2005 | Bent et al. | |
| 2006/0048071 A1 | 3/2006 | Jarrett et al. | |
| 2006/0053096 A1 | 3/2006 | Subramanian et al. | |
| 2006/0190833 A1 | 8/2006 | SanGiovanni et al. | |
| 2006/0253799 A1 | 11/2006 | Montroy | |
| 2006/0282771 A1 | 12/2006 | Vinci | |
| 2007/0024646 A1 | 2/2007 | Saarinen et al. | |
| 2007/0027851 A1 | 2/2007 | Kruy | |
| 2007/0094326 A1 | 4/2007 | Gupta | |
| 2007/0136579 A1 | 6/2007 | Levy et al. | |
| 2007/0156740 A1 | 7/2007 | Leland et al. | |
| 2007/0162439 A1 | 7/2007 | Petropoulos et al. | |
| 2007/0209023 A1 | 9/2007 | Nakagawa et al. | |
| 2007/0233854 A1 | 10/2007 | Bukovec et al. | |
| 2007/0234195 A1 | 10/2007 | Wells | |
| 2007/0288667 A1 | 12/2007 | Kamata et al. | |
| 2008/0065974 A1* | 3/2008 | Campbell | G06F 17/248 715/200 |
| 2008/0109714 A1 | 5/2008 | Kumar et al. | |
| 2008/0109785 A1 | 5/2008 | Bailey | |
| 2008/0144119 A1 | 6/2008 | Otake | |
| 2008/0177994 A1 | 7/2008 | Mayer | |
| 2008/0235618 A1 | 9/2008 | Sadouski | |
| 2008/0313648 A1 | 12/2008 | Wang et al. | |
| 2008/0320413 A1 | 12/2008 | Oshiro et al. | |
| 2009/0037605 A1 | 2/2009 | Li | |
| 2009/0055432 A1 | 2/2009 | Smith | |
| 2009/0106227 A1 | 4/2009 | Davis | |
| 2009/0119257 A1 | 5/2009 | Waters | |
| 2009/0254337 A1 | 10/2009 | Sprecher et al. | |
| 2009/0254822 A1* | 10/2009 | Greenlee | H04L 67/04 715/708 |
| 2009/0292989 A1 | 11/2009 | Matthews | |
| 2009/0319939 A1 | 12/2009 | Danton et al. | |
| 2010/0058227 A1 | 3/2010 | Danton et al. | |
| 2010/0115053 A1 | 5/2010 | Ryu et al. | |
| 2010/0174774 A1 | 7/2010 | Kern et al. | |
| 2010/0262905 A1 | 10/2010 | Li | |
| 2010/0269096 A1 | 10/2010 | Araya et al. | |
| 2010/0287530 A1 | 11/2010 | MacLean et al. | |
| 2011/0173537 A1* | 7/2011 | Hemphill | G06F 17/30038 715/716 |
| 2011/0289546 A1 | 11/2011 | Pieczul et al. | |
| 2012/0005581 A1* | 1/2012 | Turner | G06F 17/3089 715/736 |
| 2012/0023442 A1 | 1/2012 | Oshiro et al. | |
| 2012/0030591 A1 | 2/2012 | Demant et al. | |
| 2012/0079379 A1* | 3/2012 | Hathaway | G06Q 10/10 715/709 |
| 2012/0124555 A1 | 5/2012 | Bannoura et al. | |
| 2012/0151361 A1 | 6/2012 | Burton | |
| 2012/0167008 A1 | 6/2012 | Zaman et al. | |

(56) References Cited

U.S. PATENT DOCUMENTS

| | | | |
|---|---|---|---|
| 2012/0191502 A1 | 7/2012 | Gross et al. | |
| 2012/0206498 A1 | 8/2012 | Kai et al. | |
| 2012/0254723 A1 | 10/2012 | Kasa et al. | |
| 2012/0324422 A1 | 12/2012 | Chartier et al. | |
| 2012/0330668 A1 | 12/2012 | Verna et al. | |
| 2012/0331441 A1 | 12/2012 | Adamson | |
| 2013/0086508 A1 | 4/2013 | Oguz | |
| 2013/0139056 A1* | 5/2013 | Borkowski | G06F 9/44 715/705 |
| 2013/0145314 A1 | 6/2013 | Dhar et al. | |
| 2013/0191880 A1 | 7/2013 | Conlan et al. | |
| 2013/0247006 A1* | 9/2013 | Trowbridge | G06F 9/44 717/126 |
| 2014/0298253 A1* | 10/2014 | Jin | G06F 3/04842 715/790 |
| 2014/0366157 A1 | 12/2014 | Yancey et al. | |
| 2015/0058709 A1 | 2/2015 | Zaletel | |
| 2015/0095813 A1* | 4/2015 | Welicki | G06F 17/30654 715/762 |
| 2015/0149937 A1* | 5/2015 | Khalid | G06F 9/4443 715/762 |

OTHER PUBLICATIONS

Brydon, Michael, "Access Tutorial: Parameter Queries", Published Aug. 1997, Available at <<http:/ fisher.osu.edu/~muhanna.1/837/MSAccess/tutorials/param.pdf>>.
International Search Report and Written opinion Issued in PCT Patent Application No. PCT/US2014/057322, Mailed Date: Jan. 22, 2015, 9 Pages.
International Search Report and Written Opinion Issued in PCT Application No. PCT/US2014/057938, Mailed Date: Feb. 6, 2015, 11 Pages.
International Search Report & Written Opinion for PCT Patent Application No. PCT/US2014/057321, Mailed Date: Feb. 6, 2015, 8 Pages.
Kumar, Dhananjay, "Live Tiles in XAML based Windows 8 Metro Application", Published on: Mar. 29, 2012, Available at: http://debugmode.net/2012/03/29/lives-tiles-in-xaml-based-windows-8-metro-application/.
Thurrott, Paul, "Windows 8 Feature Focus: Live Tiles", Published on: Jan. 28, 2013, Available at: http://winsupersite.com/article/windows8/windows-8-feature-focus-live-tiles-144652.
"International Preliminary Report on Patentability Issued in PCT Application No. PCT/US2014/057324", Mailed Date: Aug. 5, 2015, 6 pages.
Second Written Opinion Issued in PCT Patent Application No. PCT/US2014/057321, Mailed Date: Aug. 7, 2015, 6 Pages.
"W3C Technical Reports", Published Nov. 11, 1999, 8 Pages Available at <<http://www.w3.org/Consortium/Process/Process-19991111.tr.html#RecsCR>>.
Second Written Opinion Issued in PCT Application No. PCT/US2014/057940, Mailed Date: Aug. 27, 2015, 8 Pages.
"International Search Report and Written Opinion Received for PCT Patent Application No. PCT /US2014/057323", Mailed Date: Dec. 10, 2014, 8 Pages.
"International Search Report & Written Opinion Received for PCT Patent Application No. PCT/US2014/057940", Mailed Date: Jan. 12, 2015, 10 Pages.
W3c: "HTML5—A Vocabulary and Associated APIs for HTML and XHTML", Published Aug. 6, 2013, Available at <<http://www.w3.org/TR/2013/CR-html5-20130806/embedded-content-0.html#the-iframe-element>>.

"International Search Report and Written Opinion Received for PCT patent Application No. PCT/US2014/057939" Mailed Date Dec. 1, 2014, 8 pages.
"International Search Report and Written Opinion Received for PCT patent Application No. PCT/US2014/057324" Mailed Date Dec. 1, 2014, 8 pages.
International Search Report and Written Opinion Issued in PCT Application No. PCT/US2014/057324, Mailed Date: Jun. 24, 2015, 5 Pages.
Second Written Opinion Issued in PCT Application No. PCT/US2014/057939, Mailed Date: Jun. 24, 2015, 4 Pages.
"International Preliminary Report on Patentability Issued in PCT Application No. PCT/US2014/057938", Mailed Date: Sep. 17, 2015, 7 Pages.
"International Preliminary Report on Patentability Issued in PCT Application No. PCT/US2014/057321", Mailed Date: Dec. 4, 2015, 7 Pages.
"International Preliminary Report on Patentability Issued in PCT Application No. PCT/US2014/057939", Mailed Date: Dec. 4, 2015, 5 Pages.
Office Action dated Jan. 29, 2016 cited in U.S. Appl. No. 14/231,869.
Office Action dated Feb. 1, 2016 cited in U.S. Appl. No. 14/231,880.
"International Preliminary Report on Patentability Issued in PCT Application No. PCT/US2014/057938", Mailed Date: Dec. 23, 2015, 8 Pages.
"International Preliminary Report on Patentability Issued in PCT Application No. PCT/US2014/057323", Mailed Date: Dec. 23, 2015, 7 Pages.
"International Preliminary Report on Patentability Issued in PCT Application No. PCT/US2014/057940", Mailed Date: Dec. 23, 2015, 9 Pages.
Office Action dated Feb. 26, 2016 cited in U.S. Appl. No. 14/231,891.
"International Preliminary Report on Patentability Issued in PCT Patent Application No. PCT/US2014/057322", Mailed Date: Jan. 12, 2016, 6 Pages.
U.S. Appl. No. 14/231,862, filed May 19, 2016, Office Action.
U.S. Appl. No. 14/231,846, filed Jun. 14, 2016, Office Action.
U.S. Appl. No. 14/231,897, filed Jun. 2, 2016, Office Action.
U.S. Appl. No. 14/231,905, filed Jun. 14, 2016, Office Action.
Office Action dated Aug. 17, 2016 cited in U.S. Appl. No. 14/231,869.
Notice of Allowance dated Jun. 20, 2016 cited in U.S. Appl. No. 14/231,891.
Office Action dated Sep. 6, 2016 cited in U.S. Appl. No. 14/231,880.
Office Action dated Sep. 9, 2016 cited in U.S. Appl. No. 14/231,873.
Office Action dated Sep. 16, 2016 cited in U.S. Appl. No. 14/231,897.
Office Action dated Sep. 23, 2016 cited in U.S. Appl. No. 14/231,846.
Office Action dated Nov. 2, 2016 cited in U.S. Appl. No. 14/231,905.
Office Action dated Nov. 17, 2016 cited in U.S. Appl. No. 14/231,912.
Office Action dated Jan. 11, 2017 cited in U.S. Appl. No. 14/231,917.
Notice of Allowance dated Feb. 13, 2017 cited in U.S. Appl. No. 14/231,869.
Office Action dated Apr. 3, 2017 cited in U.S. Appl. No. 14/231,880.
Ray, Li, France, Kim "Using UML to Visualize Role-Based Access Control Constraints" published Jun. 2004. Computer Science Dept. Colorado State University Fort Collings, CO—SACMAT'04, Yorktown Heights, New York, USA.
Notice of Allowance dated Mar. 29, 2017 cited in U.S. Appl. No. 14/231,905.

* cited by examiner

MULTI-ACT CREATION USER INTERFACE ELEMENT

CROSS-REFERENCE TO RELATED APPLICATIONS

This application claims the benefit of each of the following provisional patent applications, and each of the following provisional patent applications are incorporated herein by reference in their entirety:
1. U.S. Provisional Application Ser. No. 61/905,129, filed Nov. 15, 2013;
2. U.S. Provisional Application Ser. No. 61/884,743, filed Sep. 30, 2013;
3. U.S. Provisional Application Ser. No. 61/905,111, filed Nov. 15, 2013;
4. U.S. Provisional Application Ser. No. 61/905,243, filed Nov. 17, 2013;
5. U.S. Provisional Application Ser. No. 61/905,114, filed Nov. 15, 2013;
6. U.S. Provisional Application Ser. No. 61/905,116, filed Nov. 15, 2013;
7. U.S. Provisional Application Ser. No. 61/905,105, filed Nov. 15, 2013;
8. U.S. Provisional Application Ser. No. 61/905,247, filed Nov. 17, 2013;
9. U.S. Provisional Application Ser. No. 61/905,101, filed Nov. 15, 2013;
10. U.S. Provisional Application Ser. No. 61/905,128, filed Nov. 15, 2013; and
11. U.S. Provisional Application Ser. No. 61/905,119, filed Nov. 15, 2013.

BACKGROUND

Computing systems allow a wide variety of tasks to be performed, some simple and some complex, and some requiring interaction with the user. When the user is involved in a computing task that has multiple phases, the computing system often presents the user with a multi-step user interface element, often called a "wizard". The wizard guides the user through the task one step at a time, so that the user is guided through the task one step at a time.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

At least some embodiments described herein relate to a multi-act creation user interface element that is displayed when a user instructs a computing system to initiate creation of a resource that has multiple associated creation processing acts. For each of some or all of the creation processing acts, the multi-act creation user interface element causes a set of one or more controls to appear, which the user may then enter configuration information into. The multi-act creation user interface element persists creation information so entered so that the entered creation information is available for further creation processing acts.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

In accordance with embodiments described herein, a multi-act creation user interface element (also called herein a "wizard") is described. The wizard user interface element is displayed when a user instructs a computing system to initiate creation of a resource that has multiple associated creation processing acts. For each of some or all of the creation processing acts, the multi-act creation user interface element causes a set of one or more controls to appear, perhaps as a form, which the user may then enter configuration information into. The multi-act creation user interface element persists creation information so entered so that the entered creation information is available for further creation processing acts. Each of one or more of the creation processing acts displays a form having one or more controls that the user enters configuration information into. The creation processing acts may be facilitated by different applications while still being guided by the wizard user interface element.

The principles described herein may be implemented using a computing system. For instance, the users may be engaging with the system using a client computing system. The executable logic supporting the system and providing visualizations thereon may also be performed using a computing system. The computing system may even be distributed. Accordingly, a brief description of a computing system will now be provided.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems. An example computing system is illustrated in FIG. 1.

Figure 1:
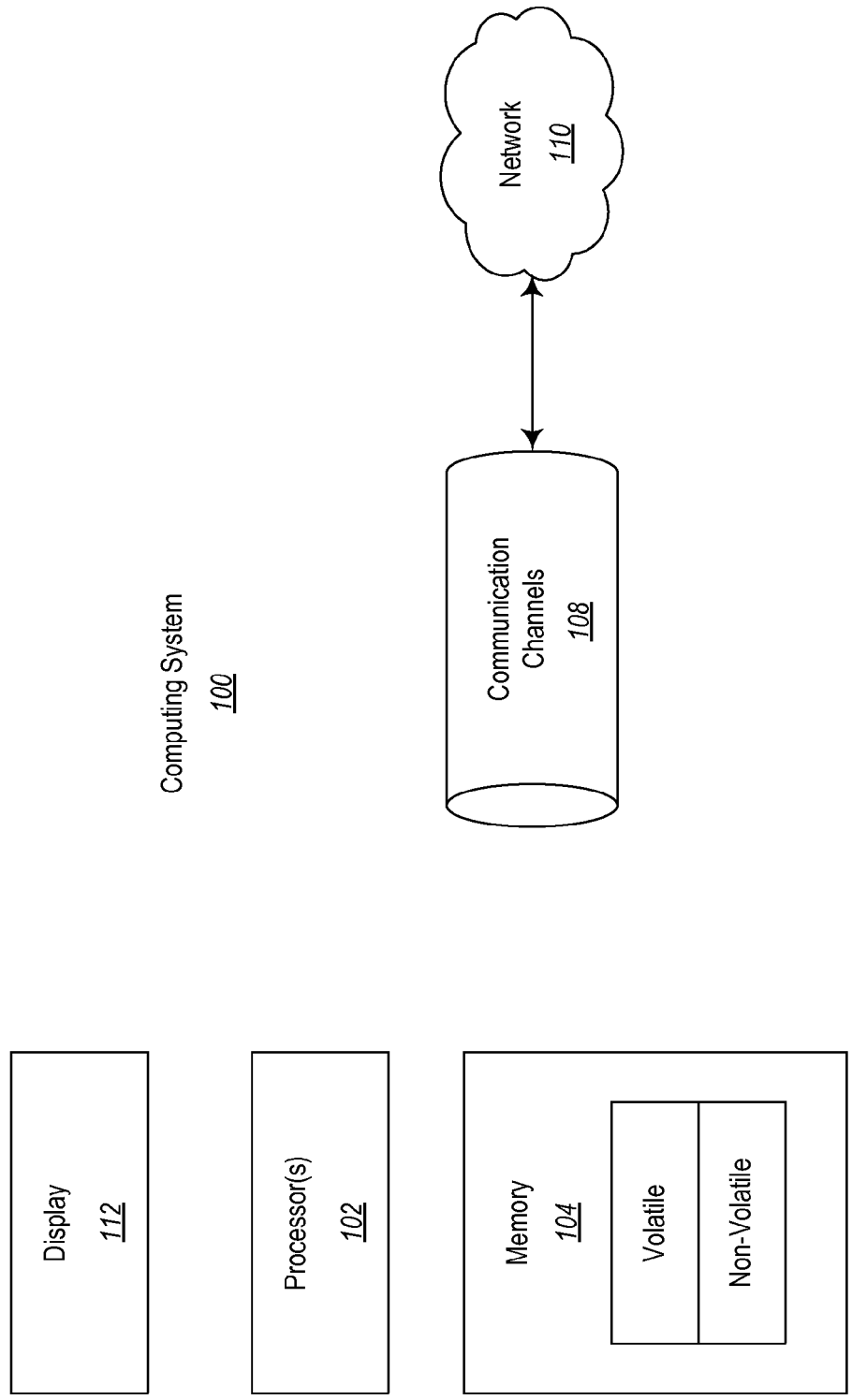
FIG. 1 abstractly illustrates an example computing system in which the principles described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

The computing system 100 also includes a display 112 on which a user interface, such as the user interfaces described herein, may be rendered. Such user interfaces may be generated in computer hardware or other computer-represented form prior to rendering. The presentation and/or rendering of such user interfaces may be performed by the computing system 100 by having the processing unit(s) 102 execute one or more computer-executable instructions that are embodied on one or more computer-readable media. Such computer-readable media may form all or a part of a computer program product.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

As will be described herein the system presents a user interface on a display (such as the display 112 of FIG. 1). The system may have one or more applications running therein. The system may be thought of as an operating system, in which case the one or more applications are simply applications running in the operating system. On the other hand, the system may also itself be just an application (such as a web browser), in which case the applications that run within the system may be thought of as "extensions" to the application. In the description and in the claims, such an "extension" will be termed an "application".

In accordance with the principles described herein, a user may interface with the portal to create resources, even if the contribution of multiple entities are used to create the resource. For instance, one creation processing act may involve the system itself, whereas another creation processing act may involve an application running in that system. As another example, one creation processing act may involve a first application, and another creation processing act may involve another application. The portal provides a multi-act creation user interface element (also called herein a "wizard" or "wizard user interface element") that allows the user to create complex resources in a single create operation, potentially with components provided by different entities. This is a complex problem as the creation of resources in distributed systems often involves client and server side interactions of code from multiple applications, and orchestration across creation processing acts involved in the creation of the resource.

In accordance with embodiments described herein, there is provided a way to govern the set of creation processing acts involved in creating a resource, even for long running execution. Furthermore, input is acquired and contemporaneously validated to ensure correctness. The system may allow sharing of data between different applications that contribute to the creation, and provide a consistent experience across different applications. The creation data involved with creating the resource may be stored, and even shared between different elements in the user interface that contribute to the creation.

The portal displays and collects data across multiple components that can come from different applications (e.g., different web sites). In order to collect that information, a full experience is provided that enables application developers to describe the logic required for creating one or related set of assets with a given order and conformance rules. To enable these set of scenarios, a number of capabilities are provided.

First, the portal projects forms, perhaps one for each of the multiple creation processing acts involved in the creation of the resource. Each form has a set of one or more controls that collect creation data. Such creation data may be input into the respective control by the user, and perhaps may have a default value that was perhaps received from creation data inputted into a prior creation processing act.

Second, each of the one or more controls in each form may contain validation rules that determine if the input is valid or not. These validation rules may be built-in (and invoked via declarative composition) or provided as code by the application developer. The system will determine where that validation code will run (in the main system or in the application's execution space) to ensure best responsiveness of the system.

Third, validations and forms may be described declaratively (e.g., as a view model and a template). All the interactions are provided by the underlying executable controls. Moreover, the application developer has control over the layout but the controls provide the lower-level interaction.

Fourth, a multi-act resource creation element (also referred to as a "wizard" herein) describes a set of creation processing acts that are to be done in a given order. Each creation processing act collects information and that information is collected using one or more controls (such as in a form).

Fifth, the wizard user interface element has rules to govern what creation processing act (i.e., what form) is displayed and if any new action needs to be taken dynamically. In addition, the creation processing acts can come from different applications or extensions (e.g., web sites) as the applications can contribute different user interface elements.

Sixth, the data from all the forms is collected and persisted by the system in space (hereinafter the space being called an "EditScope" or "edit scope"). The space is memory space that collects data and tracks changes in entities. This edit scope can survive system refreshes and can be long-running. For instance, if the system is an operating system, the edit scope survives restart of the operating system. If the system is a browser, the edit scope survives browser refresh.

Seventh, when creating a resource (which may be a complex multi-act operation), a basic user interface element (called herein a "processing status user interface element" or "provisioning user interface element") is placed in any part of the portal and represents the resource being created. Once the wizard user interface element is completed, the wizard signals back to the provisioning user interface element to execute the actual creation command. If the creation command is executed successfully, the provisioning user interface element is replaced with a resource created status user interface element, which may be a user interface element that represents the created resource itself.

Eighth, communication between all these user interface elements may be through a given protocol (e.g., by sending edit scope and metadata forward and receiving signals back upon completion).

Ninth, sometimes the wizard can be used without imposing any execution order. For example, the wizard can be displayed to a user to suggest a set of tasks that need to be performed in no particular order Embodiments described herein may addressed some or all the challenges associated with the creation of simple and complex resources.

Figure 2:
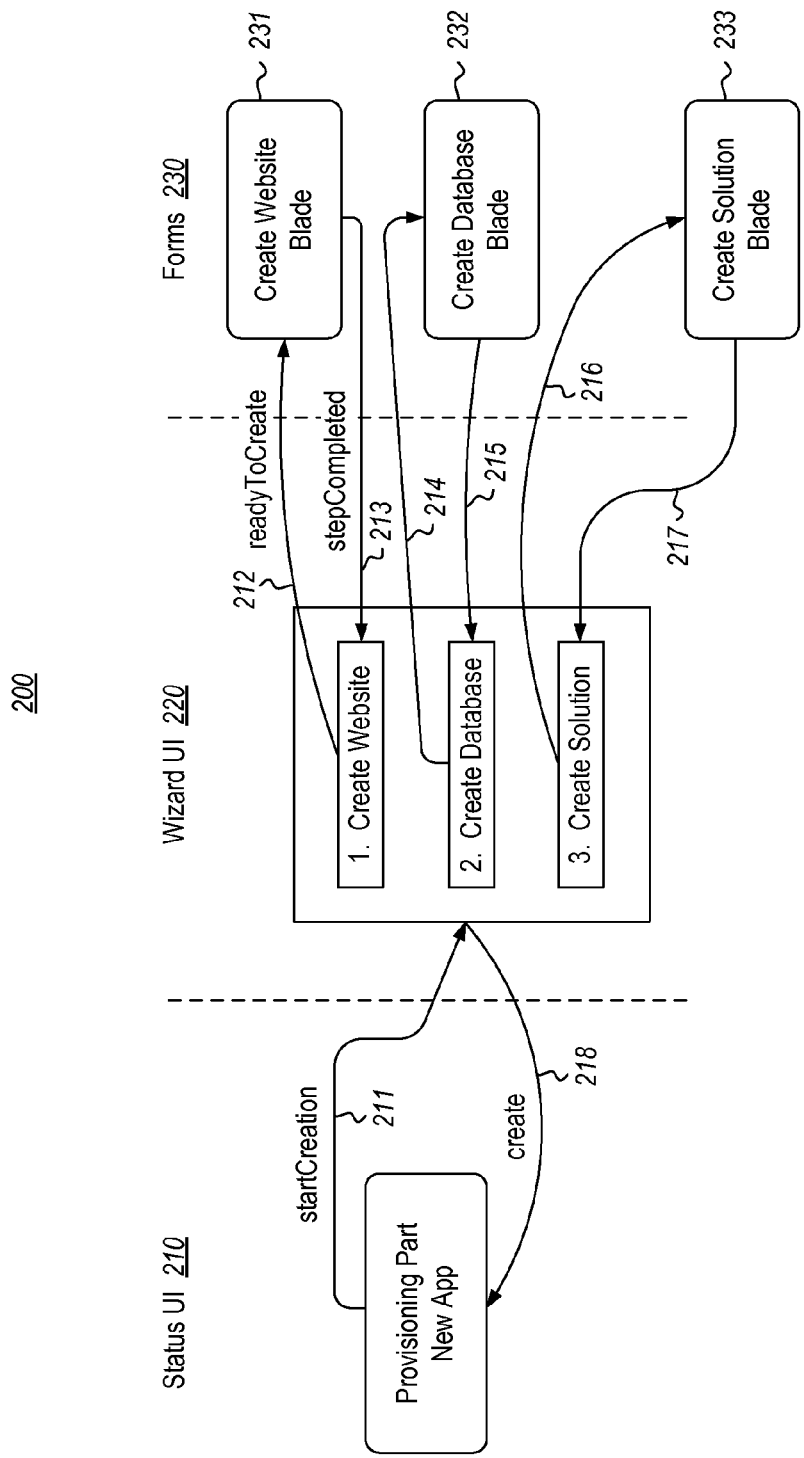
FIG. 2 illustrates an architecture and process in which there are three tiers of user interface element; namely, a status user interface element, a wizard user interface element (or the "multi-act creation user interface element), and the respective creation processing act forms.

FIG. 2 illustrates a process 200 in which there are three tiers of user interface element, a status user interface element 210, a wizard user interface element 220 (or the "multi-act creation user interface element), and the respective creation processing act forms 230. In the illustrated example of FIG. 2, there are three forms 231, 232 and 233, associated with three creation processing acts.

Initially, the user instructs the computing system to initiate creation of a resource. The principles described herein are not limited to how the user does this. However, in one embodiment, there is a resource creation initialization user interface element that gives the user the option of selecting the user interface element to thereby instruct the system to create the corresponding resource. In response, the system may replace (or morph into) the resource creation initialization user interface element with a provisioning user interface element, which is represented by the status user interface element 210 of FIG. 2.

The provisioning part 210 then creates the edit scope, which will be used to persist creation data as the user inputs that creation data into various forms during creation. If the resource being created is a complex resource (i.e., involving multiple creation processing acts), the provisioning part 210 signals (see arrow 211) for the multiple-act creation (i.e., "wizard") user interface element 220 to be created.

The wizard user interface element 220 has knowledge of all the necessary creation processing acts (which may be represented by forms) to create the resource. For instance, in this example, there are three sequential creation processing acts to be performed; namely, 1) create website, 2) create database, and 3) create solution. The wizard user interface element 220 understands dependencies between each creation processing act, keeps track of the status of each creation processing act, and determines when progress has proceeded to a point where another not-yet-started creation processing act may begin. In the case of sequential creation processing acts, the wizard user interface element 220 simply proceeds one creation processing act at a time.

When the wizard user interface element 220 determines that the new creation processing act is to be initiated, the wizard user interface element 220 causes the corresponding form to be created. For instance, in FIG. 2, as represented by arrow 212, the wizard user interface element 220 signals for creation of the form 231, which may be used to create a web site. The form 231 receives perhaps some of the edit scope (e.g., web site name) to allow for population of some of the controls and/or conditional presentation of some or all of the controls. For instance, the form 231 may be mapped to a view model which exposes the edit scope to populate fields of the form 231. The form 231 also collects information from the user, and the various controls of the form also validate the information as it is input into the control. The form 231 also has a button or control that the user may interact with to indicate completion of the creation processing act. Once complete, the creation processing act 231 signals back to the wizard user interface element 220 (as represented by the arrow 213), representing completion of the creation processing act. In this process, the input creation data from form 231 is persisted to the edit scope. Optionally, the form 231 may then be caused to disappear.

The wizard user interface element 220 responds to each completion signal by either determining that the entire creation is completed, or identifying the next creation processing act (in this case act 232). For instance, in FIG. 2, as represented by arrow 214, the wizard user interface element 220 signals for creation of the second form 232, which is used to create a database. The form 232 receives perhaps some of the edit scope to allow for population (e.g., via an appropriate view model) of some of the controls and/or conditional presentation of some or all of the controls. The form 232 also collects information from the user, and the various controls of the form also validate the information as it is input into the control. The form 232 also has a button or control that the user may interact with to indicate completion of the creation processing act. Once complete, the creation processing act 232 signals back to the wizard user interface element 220 (as represented by the arrow 215), representing completion of the creation processing act 232. In this process, the input creation data from form 232 is persisted to the edit scope. Optionally, the form 232 may then be caused to disappear.

The wizard user interface element 220 then identifies the next creation processing act (in this case act 233). For instance, in FIG. 2, as represented by arrow 216, the wizard user interface element 220 signals for creation of the second form 233, which is used to create a solution using the created website and database. The form 233 receives perhaps some of the edit scope to allow for population of some of the controls and/or conditional presentation of some or all of the controls. The form 233 also collects information from the user, and the various controls of the form also validate the information as it is input into the control. The form 233 also has a button or control that the user may interact with to indicate completion of the creation processing act. Once complete, the creation processing act 233 signals back to the wizard user interface element 220 (as represented by the arrow 217), representing completion of the creation processing act 233. In this process, the input creation data from form 233 is persisted to the edit scope. Optionally, the form 233 may then be caused to disappear.

Here, the wizard user interface element 220 determines that there are no further creation processing acts to occur. Thus, the wizard user interface element 220 signals to the provisioning user interface element 210 (as represented by arrow 218) that the resource creation is completed. The provisioning user interface element may then be replaced by a resource created status user interface element, which is a representation of the created resource. In the future, when the resource is to be used, the user may simply select the resource created status user interface element.

From this example, it can be seen that as every creation processing act is completed, the corresponding form signals back to the wizard user interface element indicating that the creation processing act is done. Once the wizard user interface element receives the signal, the wizard user interface element moves to the next creation processing act. If all the creation processing acts are completed, the wizard user interface element signals back to the provisioning user interface element. The provisioning user interface element executes the create command and mutates to the created resource.

If the resource is created in just one act, the signal form is shown without the use of the wizard user interface element. Once the form is valid and completed, the form signals back to the provisioning part. The provisioning part then executes the command and mutates to the created resource.

The forms may be composable. For instance, the create website form 231 may be used as a first creation processing act component in the creation of a compound solution, as shown in FIG. 2. However, the create website form may also be used in a single act creation, in which the user merely desires to create a web site. Thus, the forms are composable, and can be used in different create operations. This is because in each create operation, the form is able to receive the appropriate edit scope.

Each form includes a button or control that the user may interact with in order to indicate that the corresponding creation processing act is complete. In some embodiments, the control is not enabled if creation data input into the form has not been successfully validated.

Figure 3:
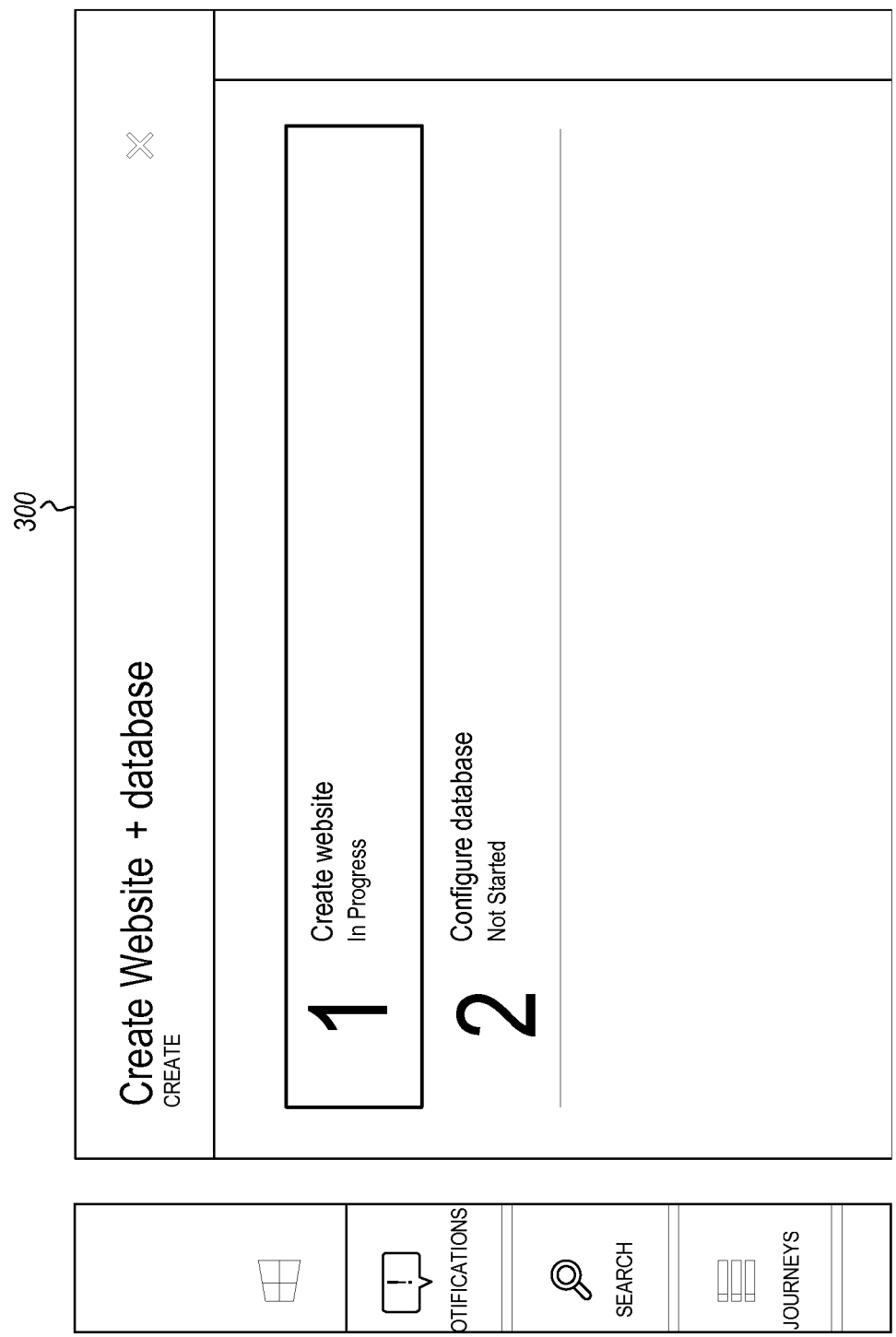
FIG. 3 illustrates a wizard user interface element involved with creating a resource that includes a website and an associated configured database.

The wizard user interface element allows application developers to define a set of creation processing acts that result in the creation of a set of resources. For instance, FIG. 3 illustrates a wizard user interface element 300 involved with creating a resource that includes a website and an associated configured data base.

Figure 4:
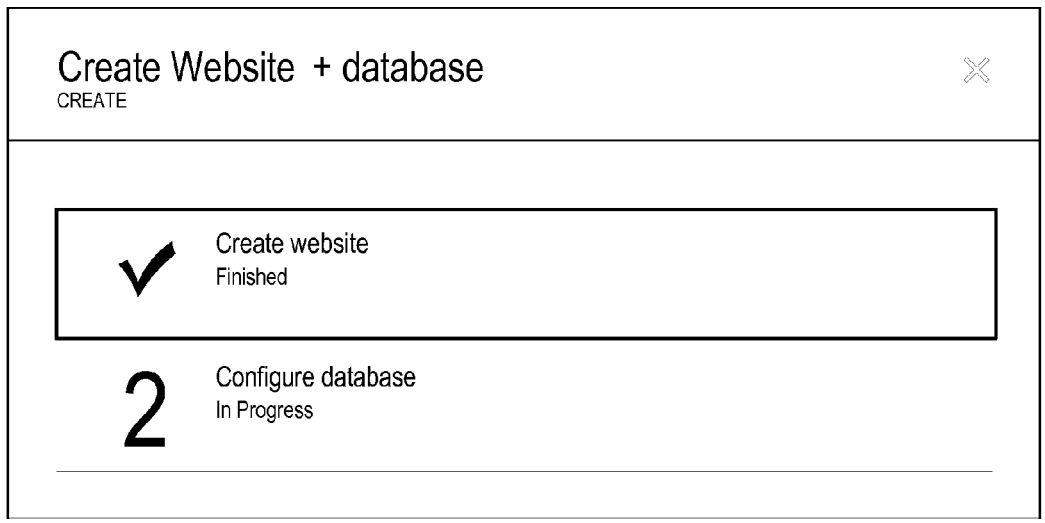
FIG. 4 illustrates the wizard user interface element of FIG. 3, except that the wizard user interface element now shows that the creation processing act of creating the website is finished.

Creation processing acts can be optional. The wizard user interface element is aware of when creation processing acts are completed and shows a visual indication of the completion. For instance, FIG. 4 is similar to FIG. 3, except that the wizard user interface element now shows the step of creating the website is finished.

In addition, the wizard user interface element has access to collected data (via the edit scope) in all creation processing acts and can perform validations across different creation processing acts from different applications. For instance, if the user tried to create a website and a database in different regions of the world, the user might get a warning about latency. Although conventional wizards imply a certain order of execution, the wizard user interface element described herein supports sets of creation processing acts without order, and also supports optional steps.

Figure 5:
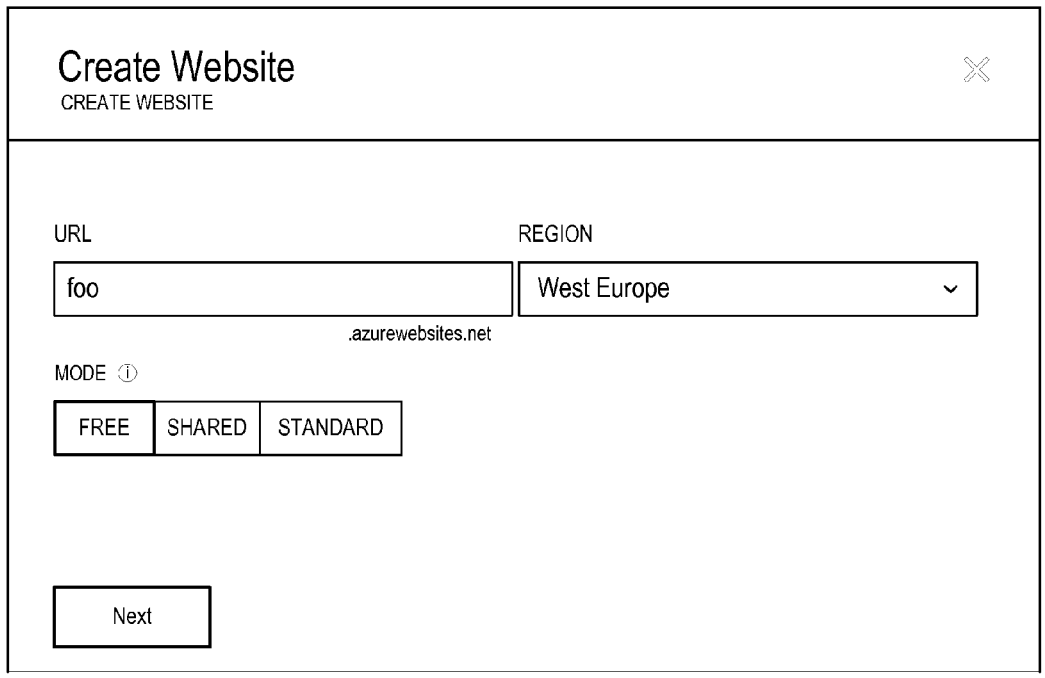
FIG. 5 illustrates an example form involved with the "Create website" creation processing act of FIGS. 3 and 4.

In some embodiments, each creation processing act in the wizard user interface element displays a form. For instance, FIG. 5 illustrates an example form involved with the "Create website" creation process act of FIGS. 3 and 4.

Figure 6:
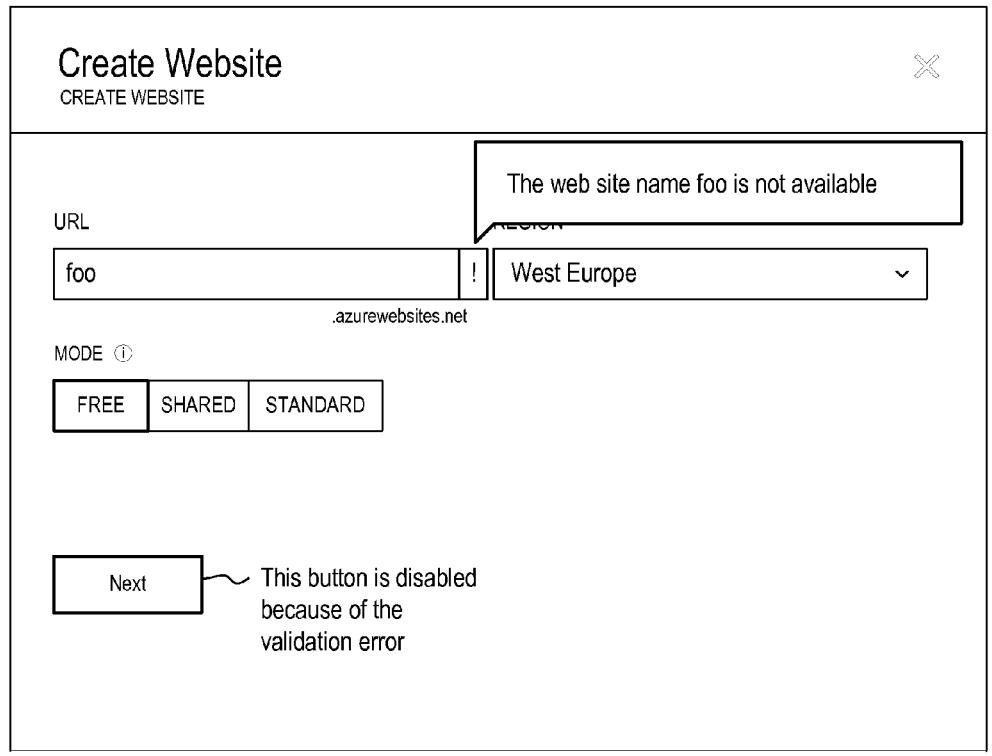
FIG. 6 illustrates an example form that is similar to that of FIG. 5, except with a validation error shown.

The form is created using a forms infrastructure from the portal that leverages the available portal controls. Application developers may define the form fields in their view models, and the form layout in the template. Thus, application developers may have control over the layout of the form. Each field has a type that determines the control to be used to acquire the data. In addition, fields can be associated with validations. The form is aware of the validation status and does not allow a creation processing act to complete if the validations do not pass. For instance, FIG. 6 illustrates an example form that is similar to that of FIG. 5, except with a validation error shown.

Also validations have a consistent user experience and behavior that is provided by the underlying controls. Forms provide complex functionality like creation of underlying controls to acquire values, dirty field tracking, and validations.

There is a set of available validations that the user can use. These validations may be declaratively associated with a field. In addition, application developers can write asynchronous validators that run their custom code (within our isolation model in which the execution is within an application execution environment). An example of this is the validation that checks that a website name is not taken.

As previously mentioned, the create data created from a create experience is stored in a container called "edit scope" or "editScope". The edit scope is a data container that contains a set of data along with differential changes made to it since its creation. Forms and edit scope are very tightly integrated. Each form field projects a property of an object in an edit scope. All these properties are observable, so changes are propagated across the stack. For instance, an input in a field results in changes in the underlying edit scope without the need of developer code. As a result of this, the edit scope provides access to all the data collected during the wizard/create operation plus the ability to know if the data is dirty. Regarding the edit scope, in general terms, forms go through the following process: they acquire the edit scope (by dereferencing it via an editScope identifier that is passed via a binding) and map it to the relevant fields in the form.

The life-cycle of the edit scope is controlled by the system and it can be specified declaratively. It can be associated with a user interface element (and hence propagated to all its children). The way in which edit scope is shared between user interface elements is by passing the edit scope via regular portal bindings. EditScopes may be automatically persisted to the cloud. An implication of this is that create operations can be long running (e.g. a complex wizard with multiple steps can be completed in multiple days).

There may be an intrinsic user interface element called "provisioning" that represents a resource that is being created. This provisioning user interface element may be placed in any part of the portal when a create operation starts. It owns the edit scope associated with the creation (which will be passed to all children that will contribute to that editScope). If the creation process has more than one creation processing act, the wizard user interface element will be displayed (when the user interface element is selected). Otherwise, the portal will just show the form to collect the data. The provisioning user interface element also invokes the command to perform the actual provisioning, so it waits for a completion signal from the wizard user interface element (in the case of multi-act creation) or the form (in the case of single act creation). Once the provisioning user interface element receives the completion signal, the provisioning user interface element executes the command. If there are no errors, the provisioning user interface element mutates to the resource that has been created as shown in FIG. 7.

Figure 7:
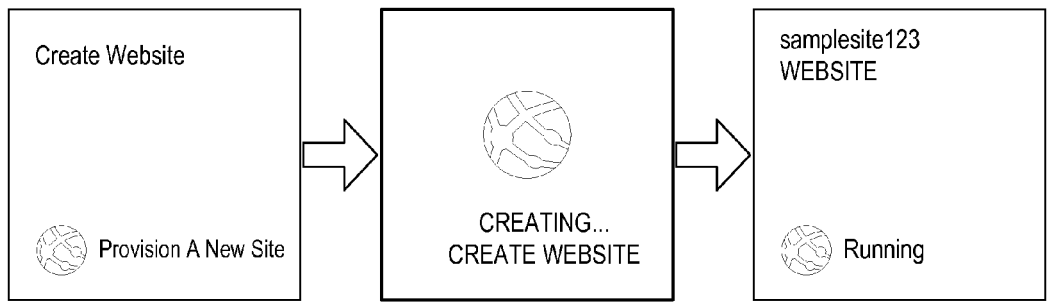
FIG. 7 illustrates a process flow wherein a user interface element is morphed from a user interface element that may be selected to create a resource, to a provisioning user interface element showing that the resources is being created, to a resource completed user interface element that may be selected to access the created resource.

FIG. 7 illustrates a process flow wherein a user interface element is morphed from a user interface element that may be selected to create a resource, to a provisioning user interface element showing that the resources is being created, to a resource completed user interface element that may be selected to access the created resource.

In one embodiment, the portal may include a canvas that extends in an extendable direction (i.e., rightward). User interface elements called blades may be added to the canvas, and are added to the end of a sequence of one or more blades that may already exist on the canvas. The canvas is extendible in the extendible direction in the sense that as new blades are added, they are added to the sequence to extend the sequence at the extendible direction (e.g., rightward). The blades may occupy substantially all of the extent of the canvas within a given range of the extendible dimension (e.g., horizontal), and occupy substantially all of the canvas in the direction orthogonal to the extendible dimension. In this context, as creation of a resource requiring multiple acts is initiated, the wizard user interface element may be added as a blade to the extendible canvas. As the user engages in particular resource creation acts, the corresponding form may additionally be added in the extendible dimension, and then perhaps disappear when that creation processing act is completed.

Accordingly, the principles described herein provide an effective mechanism to allow users to create resources in composable systems, in which multiple applications contributed to the creation.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer hardware storage media having thereon computer-executable instructions that, when executed by one or more processors of a computing system, cause the computing system to operate using an architecture which governs creation of a complex resource, and wherein the architecture of the computing system comprises three tiers of user interface (UI) elements, comprising:
- a first tier that comprises a provisioning UI element that receives an instruction to initiate creation of a complex resource and wherein the provisioning UI element creates an edit scope used to persist data that represents a set of creation processing acts for the complex resource;
- a second tier that comprises a wizard UI element instantiated by a signal from the provisioning UI element in response to the received instruction;
- a third tier that comprises a creation processing act UI element used to generate a creation processing act form for each creation processing act in the set of creation processing acts for a given complex resource; and
- wherein the wizard UI element of the second tier is configured to perform the following:
- causes a first set of one or more creation input controls to be displayed during initiation of a first creation processing act of the set of multiple creation processing acts;
    - saves a configuration input for the first creation processing act using the first set of one or more creation input controls;
    - based on dependency relationships between creation processing acts in the set, determines when the first creation processing act has proceeded to a point where another creation processing act may begin;
    - wherein the first set of one or more creation input controls is displayed as a first form created in the creation processing act UI element of the third tier, wherein some fields in the first form are populated using data from the edit scope, and wherein the first form receives and collects some user information to populate other fields in the first form;
    - validates the user information based on a first set of persisted validation rules;
    - once the corresponding form is completed, persists the corresponding form at the edit scope;
    - repeats the foregoing process until all creation processing acts of the set of multiple creation processing acts are completed for the complex resource; and
    - wherein a corresponding form for each creation processing act is added to an extendable canvas when each creation processing act is initiated, and the corresponding form is removed from the extendable canvas when the corresponding creation processing act is completed; and
- replacing the provisioning UI element of the first tier with a resource created status UI element that is thereafter used to select any complex resource created.

2. The computer program product in accordance with claim 1, wherein each creation processing act of the set of multiple creation processing acts is associated with a corresponding indicator that is emphasized when a corresponding creation processing act is initiated.

3. The computer program product in accordance with claim 1, wherein the first set of one or more creation input controls is provided by a first application running in a system, and at least one other additional set of one or more creation input controls is provided by a second application running in the system.

4. The computer program product in accordance with claim 1, wherein the first set of one or more creation input controls is provided by a system, and at least one other additional set of one or more creation input controls is provided by an application running in the system.

5. The computer program product in accordance with claim 1, wherein the first set of one or more creation input controls is provided by a system, and at least one other additional set of one or more creation input controls is provided by the system itself.

6. The computer program product in accordance with claim 3, wherein:
- the first set of one or more creation input controls performs validation checking based on a first set of persisted validation rules; and
- the at least one other additional set of one or more creation input controls performs validation checking based on a second set of persisted validation rules.

7. The computer program product in accordance with claim 1, wherein the first set of one or more creation input controls performs the first resource creation processing act upon successful validation of the first form.

8. A computer-implemented method which governs creation of a complex resource, the computer-implemented method being performed by one or more processors executing computer-executable instructions for the method, and wherein the computer-implemented method comprises:
- at a first user interface (UI) tier instantiating a provisioning UI element that:
    - receives an instruction to initiate creation of a complex resource, wherein the complex resource requires a set of multiple creation processing acts provided by different applications and that requires orchestration of the set of multiple creation processing acts among client and server side interactions; and
    - creates an edit scope used to persist data that represents the set of creation processing acts;
- at a second UI tier, instantiating a wizard UI element in response to the received instruction;
- at a third UI tier, instantiating a creation processing act UI element used to generate a creation processing act form for each creation processing act in the set of creation processing acts for a given complex resource; and
- wherein the wizard UI element of the second tier performs the following:
    - causes a first set of one or more creation input controls to be displayed during initiation of a first creation processing act of the set of multiple creation processing acts;
    - saves a configuration input for the first creation processing act using the first set of one or more creation input controls;
    - based on dependency relationships between creation processing acts in the set, determines when the first creation processing act has proceeded to a point where another creation processing act may begin;
    - wherein the first set of one or more creation input controls is displayed as a first form created in the creation processing act UI element of the third tier, wherein some fields in the first form are populated using data from the edit scope, and wherein the first form receives and collects some user information to populate other fields in the first form;
    - validates the user information based on a first set of persisted validation rules;
    - once the corresponding form is completed, persists the corresponding form at the edit scope;
    - repeats the foregoing process until all creation processing acts of the set of multiple creation processing acts are completed for the complex resource; and
    - wherein a corresponding form for each creation processing act is added to an extendable canvas when each creation processing act is initiated, and the corresponding form is removed from the extendable canvas when the corresponding creation processing act is completed.

9. The computer-implemented method in accordance with claim 8, wherein each creation processing act of the set of multiple creation processing acts is associated with a corresponding indicator that is emphasized when a corresponding creation processing act is initiated.

10. The computer-implemented method in accordance with claim 8, wherein the first set of one or more creation input controls is provided by a first application running in a system, and at least one other additional set of one or more creation input controls is provided by a second application running in the system.

11. The computer-implemented method in accordance with claim 8, wherein the first set of one or more creation input controls is provided by a system, and at least one other additional set of one or more creation input controls is provided by an application running in the system.

12. A computer system comprising:
memory for storing computer-executable instructions; and
one or more processors which, when executing the computer-executable instructions, cause the computing system to operate using an architecture which governs creation of a complex resource, and wherein the architecture of the computing system comprises three tiers of user interface (UI) elements, comprising:
a first tier that comprises a provisioning UI element that receives an instruction to initiate creation of a complex resource and wherein the provisioning UI element creates an edit scope used to persist data that represents a set of creation processing acts for the complex resource;
a second tier that comprises a wizard UI element instantiated by a signal from the provisioning UI element in response to the received instruction;
a third tier that comprises a creation processing act UI element used to generate a creation processing act form for each creation processing act in the set of creation processing acts for a given complex resource; and
wherein the wizard UI element of the second tier is configured to perform the following:
causes a first set of one or more creation input controls to be displayed during initiation of a first creation processing act of the set of multiple creation processing acts;
saves a configuration input for the first creation processing act using the first set of one or more creation input controls;
based on dependency relationships between creation processing acts in the set, determines when the first creation processing act has proceeded to a point where another creation processing act may begin;
wherein the first set of one or more creation input controls is displayed as a first form created in the creation processing act UI element of the third tier, wherein some fields in the first form are populated using data from the edit scope, and wherein the first form receives and collects some user information to populate other fields in the first form;
validates the user information based on a first set of persisted validation rules;
once the corresponding form is completed, persists the corresponding form at the edit scope;
repeats the foregoing process until all creation processing acts of the set of multiple creation processing acts are completed for the complex resource; and
wherein a corresponding form for each creation processing act is added to an extendable canvas when each creation processing act is initiated, and the corresponding form is removed from the extendable canvas when the corresponding creation processing act is completed.

13. The computer system in accordance with claim 12, wherein each creation processing act of the set of multiple creation processing acts is associated with a corresponding indicator that is emphasized when a corresponding creation processing act is initiated.

14. The computer system in accordance with claim 12, wherein the first set of one or more creation input controls is provided by a first application running in a system, and at least one other additional set of one or more creation input controls is provided by a second application running in the system.

15. The computer system in accordance with claim 14, wherein:
the first set of one or more creation input controls performs validation checking based on a first set of persisted validation rules; and
the at least one other additional set of one or more creation input controls performs validation checking based on a second set of persisted validation rules.

16. The computer system in accordance with claim 12, wherein the first set of one or more creation input controls is provided by a system, and at least one other additional set of one or more creation input controls is provided by an application running in the system.

17. The computer system in accordance with claim 12, wherein the first set of one or more creation input controls is provided by a system, and at least one other additional set of one or more creation input controls is provided by the system itself.

18. The computer system in accordance with claim 12, wherein the first set of one or more creation input controls performs the first resource creation processing act upon successful validation of the first form.

19. The computer-implemented method in accordance with claim 8, wherein the first set of one or more creation input controls is provided by a system, and at least one other additional set of one or more creation input controls is provided by the system itself.

20. The computer-implemented method in accordance with claim 8, wherein:
the first set of one or more creation input controls performs validation checking based on a first set of persisted validation rules; and
the at least one other additional set of one or more creation input controls performs validation checking based on a second set of persisted validation rules.

21. The computer-implemented method in accordance with claim 8, wherein the first set of one or more creation input controls performs the first resource creation processing act upon successful validation of the first form.

* * * * *